(12) United States Patent
Guan et al.

(10) Patent No.: US 11,071,134 B2
(45) Date of Patent: *Jul. 20, 2021

(54) FEEDBACK INFORMATION RECEIVING METHOD, BASE STATION AND USER EQUIPMENT

(71) Applicant: HUAWEI TECHNOLOGIES CO., LTD., Guangdong (CN)

(72) Inventors: Lei Guan, Beijing (CN); Yongxia Lyu, Beijing (CN); Zhiyu Yan, Shenzhen (CN); Jiehua Xiao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/728,996

(22) Filed: Dec. 27, 2019

(65) Prior Publication Data
US 2020/0137784 A1 Apr. 30, 2020

Related U.S. Application Data

(63) Continuation of application No. 15/895,060, filed on Feb. 13, 2018, now Pat. No. 10,568,123, and a
(Continued)

(51) Int. Cl.
*H04W 72/12* (2009.01)
*H04L 5/00* (2006.01)
(Continued)

(52) U.S. Cl.
CPC ...... *H04W 72/1278* (2013.01); *H04B 7/0626* (2013.01); *H04L 5/0082* (2013.01);
(Continued)

(58) Field of Classification Search
CPC ... H04L 5/0055; H04L 5/0082; H04L 5/0094; H04L 5/0007; H04L 5/0053;
(Continued)

(56) References Cited

U.S. PATENT DOCUMENTS

2009/0247196 A1 10/2009 Kim et al.
2011/0243066 A1* 10/2011 Nayeb Nazar ........ H04L 5/0016
370/328
(Continued)

FOREIGN PATENT DOCUMENTS

CN 101369874 2/2009
CN 2013507067 2/2013
(Continued)

OTHER PUBLICATIONS

3GPP TS 36.211 V12.6.0 (Jun. 2015), "3rd Generation Partnership Project; Technical Specification Group Radio Access Network; Evolved Universal Terrestrial Radio Access (E-UTRA); Physical channels and modulation (Release 12)," Jun. 2015, 136 pages.
(Continued)

*Primary Examiner* — Mewale A Ambaye
(74) *Attorney, Agent, or Firm* — Fish & Richardson P.C.

(57) ABSTRACT

The present disclosure describes methods, user equipment, and base stations for sending feedback information. One example method includes: sending scheduling information on a downlink control channel to user equipment, wherein the downlink control channel is in a downlink subframe which belongs to a preconfigured downlink subframe set, and the scheduling information is used for scheduling downlink data; determining an uplink subframe for receiving feedback information corresponding to the downlink data, wherein the preconfigured downlink subframe set is a set of downlink subframes that are associated with the uplink subframe and that are of all carriers configured for the user equipment by the base station; sending PUCCH resource indication information to the user equipment for indicating a PUCCH resource.

23 Claims, 5 Drawing Sheets

Related U.S. Application Data continuation of application No. PCT/CN2015/086939, filed on Aug. 14, 2015.

(51) Int. Cl.
*H04B 7/06* (2006.01)
*H04W 72/04* (2009.01)
*H04W 48/16* (2009.01)
*H04W 88/08* (2009.01)

(52) U.S. Cl.
CPC ....... *H04L 5/0094* (2013.01); *H04W 72/0466* (2013.01); *H04L 5/0007* (2013.01); *H04L 5/0055* (2013.01); *H04W 48/16* (2013.01); *H04W 72/0413* (2013.01); *H04W 88/08* (2013.01)

(58) Field of Classification Search
CPC ............ H04L 5/0073; H04W 72/0466; H04W 72/1278; H04W 88/08; H04W 72/0413; H04W 48/16
See application file for complete search history.

(56) References Cited

U.S. PATENT DOCUMENTS

| | | |
|---|---|---|
| 2012/0113876 A1 | 5/2012 | Li et al. |
| 2012/0176991 A1 | 7/2012 | Chen et al. |
| 2012/0195267 A1 | 8/2012 | Dai et al. |
| 2012/0294204 A1 | 11/2012 | Chen et al. |
| 2013/0230033 A1* | 9/2013 | Lee ...................... H04L 1/1854 370/336 |
| 2014/0036814 A1 | 2/2014 | Li et al. |
| 2015/0189658 A1* | 7/2015 | Zhang .................. H04B 7/0619 370/280 |
| 2015/0223208 A1 | 8/2015 | Park et al. |
| 2016/0337789 A1 | 11/2016 | Rokhsaz |
| 2017/0048026 A1* | 2/2017 | Park ...................... H04L 1/1864 |
| 2017/0302412 A1* | 10/2017 | Guan .................... H04L 5/0055 |
| 2018/0132265 A1 | 5/2018 | Guan et al. |
| 2018/0167935 A1 | 6/2018 | Yan et al. |
| 2018/0176939 A1 | 6/2018 | Guan et al. |
| 2018/0213524 A1* | 7/2018 | Xiao ..................... H04L 5/0055 |
| 2019/0191486 A1* | 6/2019 | Myung ................ H04L 5/0055 |
| 2020/0162207 A1* | 5/2020 | Hwang ..................... H04L 1/18 |

FOREIGN PATENT DOCUMENTS

| | | |
|---|---|---|
| CN | 2014502450 | 1/2014 |
| CN | 104009785 | 8/2014 |
| CN | 104144041 | 11/2014 |
| CN | 104823499 | 8/2015 |
| CN | 104885376 A | 9/2015 |
| JP | 2013507067 A | 2/2013 |
| JP | 2014502450 A | 1/2014 |
| WO | 2014018984 | 1/2014 |
| WO | 2014019236 | 2/2014 |
| WO | 2014047860 | 4/2014 |

OTHER PUBLICATIONS

3GPP TS 36.212 V12.5.0 (Jun. 2015), "3rd Generation Partnership Project; Technical Specification Group Radio Access Network; Evolved Universal Terrestrial Radio Access (E-UTRA); Multiplexing and channel coding (Release 12)," Jun. 2015, 94 pages.

3GPP TS 36.213 V12.6.0 (Jun. 2015), 3rd Generation Partnership Project, Technical Specification Group Radio Access Network, Evolved Universal Terrestrial Radio Access (E-UTRA), Physical layer procedures(Release 12), 241 pages.

Extended European Search Report issued in European Application No. 15901211.1 dated Jun. 18, 2018, 8 pages.

International Search Report issued in International Application No. PCT/CN2015/086939 dated May 19, 2016, 6 pages.

Japanese Office Action issued in Japanese Application No. 2018-507567 dated Jan. 29, 2019, 7 pages.

Office Action issued in Chinese Application No. 201580082377.9 dated Dec. 3, 2019, 7 pages.

Office Action issued in Japanese Application No. 2018-507567 dated Mar. 23, 2021, 7 pages (with English translation).

\* cited by examiner

FEEDBACK INFORMATION RECEIVING METHOD, BASE STATION AND USER EQUIPMENT

CROSS-REFERENCE TO RELATED APPLICATION

This application is a continuation of U.S. patent application Ser. No. 15/895,060, filed on Feb. 13, 2018, which is a continuation of International Application No. PCT/CN2015/086939, filed on Aug. 14, 2015, the disclosure of which is hereby incorporated by reference in its entirety.

TECHNICAL FIELD

The present disclosure relates to the field of wireless communications, and in particular, to a feedback information sending method, user equipment, and a base station.

BACKGROUND

Carrier aggregation (CA) means that a base station configures multiple consecutive or inconsecutive carriers for user equipment (UE), and the UE can perform uplink and downlink transmission simultaneously by using the multiple carriers, so as to increase a data transmission rate. The UE can detect a physical downlink control channel (PDCCH) in a subframe of a carrier, and receive information on a downlink data channel or send information on an uplink data channel according to scheduling information carried on the PDCCH.

In a hybrid automatic repeat request (HARQ) mechanism of a Long Term Evolution (LTE) system, after receiving downlink data that is sent by a base station by using a physical downlink shared channel (PDSCH), UE feeds back a response information codebook on a physical uplink control channel (PUCCH). The response information codebook includes an acknowledgement (ACK) and a negative acknowledgement (NACK). If the UE correctly decodes the downlink data received in a downlink subframe, the UE feeds back an ACK, or if the UE incorrectly decodes the downlink data, the UE feeds back a NACK.

A feedback information sending method in the prior art is generally as follows: A base station configures M carriers in total for UE. When the base station performs scheduling in N downlink subframes of the M carriers, the UE generates ACK/NACK codebooks according to the N downlink subframes of the M carriers, fills a NACK at a position of an ACK/NACK codebook corresponding to a downlink subframe in which scheduling is not performed, and then sends an ACK/NACK codebook on a PUCCH resource in an uplink subframe of a primary carrier.

However, when downlink data occupies only a relatively small part of the N downlink subframes of the M carriers that are configured for the UE, a relatively large quantity of NACKs are filled, due to no scheduling, in the ACK/NACK codebooks that are generated by the UE according to the N downlink subframes of the M carriers. As a result, PUCCH resource utilization is low.

SUMMARY

Embodiments of the present disclosure provide a feedback information sending method, user equipment, and a base station, to determine a bit quantity of an ACK/NACK codebook, and select, according to the bit quantity of the ACK/NACK codebook, a PUCCH resource corresponding to the bit quantity of the ACK/NACK codebook, so as to improve PUCCH resource utilization.

A first aspect of the present disclosure provides UE, including:

a receiving module, configured to receive scheduling information that is sent by a base station by using a downlink control channel, where the downlink control channel belongs to a preconfigured downlink subframe set, where the receiving module is further configured to receive downlink data that is on a downlink data channel and that is scheduled according to the scheduling information;

a processing module, configured to determine an uplink subframe, where the uplink subframe is used to send feedback information corresponding to the downlink data, and the preconfigured downlink subframe set is a set of downlink subframes that are associated with the uplink subframe and that are of all carriers configured for the UE by the base station, where the processing module is further configured to determine a codebook of the feedback information;

the processing module is further configured to perform channel encoding on the feedback information according to the codebook of the feedback information; and the processing module is further configured to determine a PUCCH resource according to physical uplink control channel PUCCH resource indication information; and a sending module, configured to send, on the PUCCH resource in the uplink subframe, encoded feedback information.

With reference to the first aspect of the present disclosure, in a first implementation of the first aspect of the present disclosure, the codebook of the feedback information is a first codebook, and the processing module is specifically configured to:

determine the first codebook according to a downlink assignment index (DAI) accumulation indication, where the DAI accumulation indication is located in each piece of scheduling information of the real-time scheduled downlink subframe subset, a value of the DAI accumulation indication is accumulatively counted according to a sequence of precedence of carriers over subframes in the real-time scheduled downlink subframe subset, the first codebook corresponds to the real-time scheduled downlink subframe subset, and the real-time scheduled downlink subframe subset is a set of downlink subframes that are currently actually scheduled and that are in the preconfigured downlink subframe set.

With reference to the first aspect of the present disclosure, in a second implementation of the first aspect of the present disclosure, the processing module is specifically configured to: determine the first codebook according to the DAI accumulation indication and a DAI total quantity indication, where the DAI total quantity indication is used to indicate a quantity of downlink subframes in the real-time scheduled downlink subframe subset.

With reference to either of the implementations of the first aspect of the present disclosure, in a third implementation, the processing module is specifically configured to:

determine the first codebook according to a first status of the PUCCH resource indication information and the DAI accumulation indication.

With reference to any one of the implementations of the first aspect of the present disclosure, in a fourth implementation, the processing module is specifically configured to:

determine a preconfigured PUCCH resource set in the uplink subframe; and determine the PUCCH resource in the resource set according to a bit quantity of the first codebook and the PUCCH resource indication information.

With reference to any one of the implementations of the first aspect of the present disclosure, in a fifth implementation, the processing module is specifically configured to:

when the bit quantity of the first codebook is greater than or equal to a preset threshold, determine the PUCCH resource in the resource set according to the bit quantity of the first codebook, a bit quantity of a cyclic redundancy check (CRC), and the PUCCH resource indication information; and/or when the bit quantity of the first codebook is less than a preset threshold, determine the PUCCH resource in the resource set according to the bit quantity of the first codebook and the PUCCH resource indication information.

With reference to any one of the implementations of the first aspect of the present disclosure, in a sixth implementation, the processing module is specifically configured to:

determine a bit capacity interval according to the bit quantity of the first codebook and the bit quantity of the CRC; and determine the PUCCH resource in the resource set according to the bit capacity interval and the PUCCH resource indication information.

With reference to any one of the implementations of the first aspect of the present disclosure, in a seventh implementation, the processing module is specifically configured to: determine a bit capacity interval according to the bit quantity of the first codebook; and determine the PUCCH resource in the resource set according to the bit capacity interval and the PUCCH resource indication information.

With reference to the first aspect of the present disclosure, in an eighth implementation, the codebook of the feedback information is a second codebook, and the processing module is specifically configured to:

determine a preconfigured downlink subframe subset, where the preconfigured downlink subframe subset belongs to the preconfigured downlink subframe set; and determine the second codebook according to the preconfigured downlink subframe subset.

With reference to the eighth implementation of the first aspect of the present disclosure, in a ninth implementation, the processing module is specifically configured to:

determine the second codebook according to a second status of the PUCCH resource indication information and the preconfigured downlink subframe subset.

With reference to the eighth or the ninth implementation of the first aspect of the present disclosure, in a tenth implementation, the processing module is specifically configured to determine the PUCCH resource according to the PUCCH resource indication information and the preconfigured downlink subframe subset.

With reference to the eighth, the ninth, or the tenth implementation of the first aspect of the present disclosure, in an eleventh implementation, the processing module is specifically configured to:

determine the PUCCH resource according to the PUCCH resource indication information and a DAI total quantity indication.

A second aspect of the present disclosure provides a base station, including:

a sending module, configured to: send scheduling information to user equipment UE by using a downlink control channel, and send downlink data by using a downlink data channel, where the downlink control channel belongs to a preconfigured downlink subframe set, and the scheduling information is used to schedule the downlink data;

a processing module, configured to determine an uplink subframe, where the uplink subframe is used by the UE to send feedback information corresponding to the downlink data, and the preconfigured downlink subframe set is a set of downlink subframes that are associated with the uplink subframe and that are of all carriers configured for the UE by the base station, where the processing module is further configured to determine a PUCCH resource; and a receiving module, configured to receive, on the PUCCH resource in the uplink subframe, encoded feedback information that is sent by the UE, where the processing module is further configured to decode the received encoded feedback information, to obtain a codebook of the feedback information.

With reference to the second aspect of the present disclosure, in a first implementation of the second aspect of the present disclosure, the scheduling information includes a DAI accumulation indication, where the DAI accumulation indication is used to instruct the UE to determine a first codebook, the DAI accumulation indication is located in each piece of scheduling information of the real-time scheduled downlink subframe subset, a value of the DAI accumulation indication is accumulatively counted according to a sequence of precedence of carriers over subframes in the real-time scheduled downlink subframe subset, the first codebook corresponds to the real-time scheduled downlink subframe subset, and the real-time scheduled downlink subframe subset is a set of downlink subframes that are currently actually scheduled and that are in the preconfigured downlink subframe set.

With reference to the first implementation of the second aspect of the present disclosure, in a second implementation of the second aspect of the present disclosure, the scheduling information further includes a DAI total quantity indication, and the DAI total quantity indication is used to indicate a quantity of downlink subframes in the real-time scheduled downlink subframe subset.

With reference to either of the implementations of the second aspect of the present disclosure, in a third implementation of the second aspect of the present disclosure, the scheduling information includes PUCCH resource indication information, the PUCCH resource indication information is a first status of the PUCCH resource indication information, and the first status of the PUCCH resource indication information is used to instruct the UE to determine the first codebook.

With reference to any one of the implementations of the second aspect of the present disclosure, in a fourth implementation of the second aspect of the present disclosure, the scheduling information includes PUCCH resource indication information, and the PUCCH resource indication information and a bit quantity of the first codebook are used to indicate the PUCCH resource.

With reference to the second aspect of the present disclosure, in a fifth implementation of the second aspect of the present disclosure, the processing module is specifically configured to:

determine a preconfigured downlink subframe subset, where the preconfigured downlink subframe subset belongs to the preconfigured downlink subframe set, the scheduling information belongs to the preconfigured downlink subframe subset, and the preconfigured downlink subframe subset is used by the UE to determine a second codebook.

With reference to the fifth implementation of the second aspect of the present disclosure, in a sixth implementation of the second aspect of the present disclosure, the scheduling information includes PUCCH resource indication information, the PUCCH resource indication information is a second status of the PUCCH resource indication information, and the second status of the PUCCH resource indication information is used to instruct the UE to determine the second codebook.

With reference to the fifth or the sixth implementation of the second aspect of the present disclosure, in a seventh implementation of the second aspect of the present disclosure, the scheduling information includes PUCCH resource indication information, and the PUCCH resource indication information and the preconfigured downlink subframe subset are used to instruct the UE to determine the PUCCH resource.

With reference to the fifth, the sixth, or the seventh implementation of the second aspect of the present disclosure, in an eighth implementation of the second aspect of the present disclosure, the scheduling information includes PUCCH resource indication information and a DAI total quantity indication, and the DAI total quantity indication is used to instruct the UE to determine the PUCCH resource.

A third aspect of the embodiments of the present disclosure provides a feedback information sending method, including:

receiving, by UE, scheduling information that is sent by a base station by using a downlink control channel, where the downlink control channel belongs to a preconfigured downlink subframe set;

receiving, by the UE, downlink data that is on a downlink data channel and that is scheduled according to the scheduling information;

determining, by the UE, an uplink subframe, where the uplink subframe is used to send feedback information corresponding to the downlink data, and the preconfigured downlink subframe set is a set of downlink subframes that are associated with the uplink subframe and that are of all carriers configured for the UE by the base station;

determining, by the UE, a codebook of the feedback information;

performing, by the UE, channel encoding on the feedback information according to the codebook of the feedback information;

determining, by the UE, a PUCCH resource according to physical uplink control channel PUCCH resource indication information; and sending, by the UE on the PUCCH resource in the uplink subframe, encoded feedback information.

With reference to the third aspect of the present disclosure, in a first implementation of the third aspect of the present disclosure, the codebook of the feedback information is a first codebook, and the determining, by the UE, a codebook of the feedback information includes:

determining, by the UE, the first codebook according to a DAI accumulation indication, where the DAI accumulation indication is located in each piece of scheduling information of the real-time scheduled downlink subframe subset, a value of the DAI accumulation indication is accumulatively counted according to a sequence of precedence of carriers over subframes in the real-time scheduled downlink subframe subset, the first codebook corresponds to the real-time scheduled downlink subframe subset, and the real-time scheduled downlink subframe subset is a set of downlink subframes that are currently actually scheduled and that are in the preconfigured downlink subframe set.

With reference to the first implementation of the third aspect of the present disclosure, in a second implementation of the third aspect of the present disclosure, the determining, by the UE, the first codebook according to a DAI accumulation indication includes:

determining, by the UE, the first codebook according to the DAI accumulation indication and a DAI total quantity indication, where the DAI total quantity indication is used to indicate a quantity of downlink subframes in the real-time scheduled downlink subframe subset.

With reference to either of the implementations of the third aspect of the present disclosure, in a third implementation of the third aspect of the present disclosure, the determining, by the UE, the first codebook according to a DAI accumulation indication includes:

determining, by the UE, the first codebook according to a first status of the PUCCH resource indication information and the DAI accumulation indication.

With reference to the first implementation of the third aspect of the present disclosure, in a fourth implementation of the third aspect of the present disclosure, the determining, by the UE, a PUCCH resource according to PUCCH resource indication information includes:

determining, by the UE, a preconfigured PUCCH resource set in the uplink subframe; and determining, by the UE, the PUCCH resource in the resource set according to a bit quantity of the first codebook and the PUCCH resource indication information.

With reference to the fourth implementation of the third aspect of the present disclosure, in a fifth implementation of the third aspect of the present disclosure, the determining, by the UE, the PUCCH resource in the resource set according to a bit quantity of the first codebook and the PUCCH resource indication information includes:

when the bit quantity of the first codebook is greater than or equal to a preset threshold, determining, by the UE, the PUCCH resource in the resource set according to the bit quantity of the first codebook, a bit quantity of a cyclic redundancy check CRC, and the PUCCH resource indication information; and/or when the bit quantity of the first codebook is less than a preset threshold, determining, by the UE, the PUCCH resource in the resource set according to the bit quantity of the first codebook and the PUCCH resource indication information.

With reference to the fifth implementation of the third aspect of the present disclosure, in a sixth implementation of the third aspect of the present disclosure, the determining, by the UE, the PUCCH resource in the resource set according to the bit quantity of the first codebook, a bit quantity of a CRC, and the PUCCH resource indication information includes:

determining, by the UE, a bit capacity interval according to the bit quantity of the first codebook and the bit quantity of the CRC; and determining, by the UE, the PUCCH resource in the resource set according to the bit capacity interval and the PUCCH resource indication information.

With reference to the fifth implementation of the third aspect of the present disclosure, in a seventh implementation of the third aspect of the present disclosure, the determining, by the UE, the PUCCH resource in the resource set according to the bit quantity of the first codebook and the PUCCH resource indication information includes:

determining, by the UE, a bit capacity interval according to the bit quantity of the first codebook; and determining, by the UE, the PUCCH resource in the resource set according to the bit capacity interval and the PUCCH resource indication information.

With reference to the third aspect of the present disclosure, in an eighth implementation of the third aspect of the present disclosure, the codebook of the feedback information is a second codebook, and the determining, by the UE, a codebook of the feedback information includes:

determining, by the UE, a preconfigured downlink subframe subset, where the preconfigured downlink subframe subset belongs to the preconfigured downlink subframe set; and determining, by the UE, the second codebook according to the preconfigured downlink subframe subset.

With reference to the eighth implementation of the third aspect of the present disclosure, in a ninth implementation of the third aspect of the present disclosure, the determining, by the UE, the second codebook according to the preconfigured downlink subframe subset includes:

determining, by the UE, the second codebook according to a second status of the PUCCH resource indication information and the preconfigured downlink subframe subset.

With reference to the eighth implementation of the third aspect of the present disclosure, in a tenth implementation of the third aspect of the present disclosure, the determining, by the UE, a PUCCH resource according to PUCCH resource indication information includes:

determining, by the UE, the PUCCH resource according to the PUCCH resource indication information and the preconfigured downlink subframe subset.

With reference to the eighth implementation of the third aspect of the present disclosure, in an eleventh implementation of the third aspect of the present disclosure, the determining, by the UE, a PUCCH resource according to PUCCH resource indication information includes:

determining, by the UE, the PUCCH resource according to the PUCCH resource indication information and a DAI total quantity indication.

A fourth aspect of the present disclosure provides a feedback information receiving method, including:

sending, by a base station, scheduling information to user equipment UE by using a downlink control channel, and sending downlink data by using a downlink data channel, where the downlink control channel belongs to a preconfigured downlink subframe set, and the scheduling information is used to schedule the downlink data;

determining, by the base station, an uplink subframe, where the uplink subframe is used by the UE to send feedback information corresponding to the downlink data, and the preconfigured downlink subframe set is a set of downlink subframes that are associated with the uplink subframe and that are of all carriers configured for the UE by the base station;

determining, by the base station, a PUCCH resource;

receiving, by the base station on the PUCCH resource in the uplink subframe, encoded feedback information that is sent by the UE; and decoding, by the base station, the received encoded feedback information, to obtain a codebook of the feedback information.

With reference to the fourth aspect of the present disclosure, in a first implementation of the fourth aspect of the present disclosure, the scheduling information includes a downlink assignment index DAI accumulation indication, where the DAI accumulation indication is used to instruct the UE to determine a first codebook, the DAI accumulation indication is located in each piece of scheduling information of the real-time scheduled downlink subframe subset, a value of the DAI accumulation indication is accumulatively counted according to a sequence of precedence of carriers over subframes in the real-time scheduled downlink subframe subset, the first codebook corresponds to the real-time scheduled downlink subframe subset, and the real-time scheduled downlink subframe subset is a set of downlink subframes that are currently actually scheduled and that are in the preconfigured downlink subframe set.

With reference to the first implementation of the fourth aspect of the present disclosure, in a second implementation of the fourth aspect of the present disclosure, the scheduling information further includes a DAI total quantity indication, and the DAI total quantity indication is used to indicate a quantity of downlink subframes in the real-time scheduled downlink subframe subset.

With reference to the first implementation of the fourth aspect of the present disclosure, or the second implementation of the fourth aspect of the present disclosure, in a third implementation of the fourth aspect of the present disclosure, the scheduling information includes PUCCH resource indication information, the PUCCH resource indication information is a first status of the PUCCH resource indication information, and the first status of the PUCCH resource indication information is used to instruct the UE to determine the first codebook.

With reference to the second implementation of the fourth aspect of the present disclosure, or the third implementation of the fourth aspect of the present disclosure, in a fourth implementation of the fourth aspect of the present disclosure, the scheduling information includes PUCCH resource indication information, and the PUCCH resource indication information and a bit quantity of the first codebook are used to indicate the PUCCH resource.

With reference to the fourth aspect of the present disclosure, in a fifth implementation of the fourth aspect of the present disclosure, the method further includes:

determining, by the base station, a preconfigured downlink subframe subset, where the preconfigured downlink subframe subset belongs to the preconfigured downlink subframe set, the scheduling information belongs to the preconfigured downlink subframe subset, and the preconfigured downlink subframe subset is used by the UE to determine a second codebook.

With reference to the fifth implementation of the fourth aspect of the present disclosure, in a sixth implementation of the fourth aspect of the present disclosure, the scheduling information includes PUCCH resource indication information, the PUCCH resource indication information is a second status of the PUCCH resource indication information, and the second status of the PUCCH resource indication information is used to instruct the UE to determine the second codebook.

With reference to the fifth implementation of the fourth aspect of the present disclosure, in a seventh implementation of the fourth aspect of the present disclosure, the scheduling information includes PUCCH resource indication information, and the PUCCH resource indication information and the preconfigured downlink subframe subset are used to instruct the UE to determine the PUCCH resource.

With reference to the fifth implementation of the fourth aspect of the present disclosure, in an eighth implementation of the fourth aspect of the present disclosure, the scheduling information includes PUCCH resource indication information and a DAI total quantity indication, and the DAI total quantity indication is used to instruct the UE to determine the PUCCH resource.

The UE receives the scheduling information that is sent by the base station by using the downlink control channel, where the downlink control channel belongs to the preconfigured downlink subframe set; receives the downlink data that is on the downlink data channel and that is scheduled according to the scheduling information; determines the uplink subframe according to the downlink data, where the uplink subframe is used to send the feedback information, and the preconfigured downlink subframe set is a set of downlink subframes that are associated with the uplink subframe and that are of all carriers configured for the UE by the base station; determines the codebook of the feedback information; performs channel encoding on the feedback information according to the codebook of the feedback information; determines the PUCCH resource according to the PUCCH resource indication information; and sends, on the PUCCH resource in the uplink subframe, the encoded feedback information. The UE can determine an ACK/NACK codebook, and select, according to a bit quantity of the ACK/NACK, a PUCCH resource suitable for the bit quantity to transmit the feedback information. All or most of the feedback information is an ACK, thereby avoiding relatively low PUCCH resource utilization.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person skilled in the art based on the embodiments of the present disclosure without creative efforts shall fall within the protection scope of the present disclosure.

Figure 1:
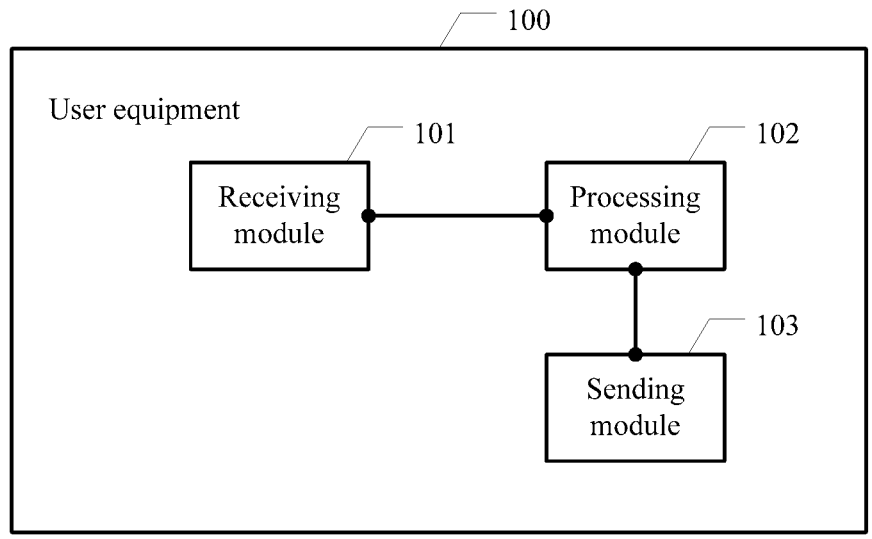
FIG. 1 is a schematic structural diagram of UE according to an embodiment of the present disclosure.

The following describes UE for implementing a feedback information sending method. Referring to FIG. 1, an embodiment of the UE in an embodiment of the present disclosure includes a receiving module 101, a processing module 102, and a sending module 103.

The receiving module 101 is configured to receive scheduling information that is sent by a base station by using a downlink control channel, where the downlink control channel belongs to a preconfigured downlink subframe set.

The receiving module 101 is further configured to receive downlink data that is on a downlink data channel and that is scheduled according to the scheduling information.

The processing module 102 is configured to determine an uplink subframe, where the uplink subframe is used to send feedback information corresponding to the downlink data, and the preconfigured downlink subframe set is a set of downlink subframes that are associated with the uplink subframe and that are of all carriers configured for the UE by the base station.

The processing module 102 is further configured to determine a codebook of the feedback information.

The processing module 102 is further configured to perform channel encoding on the feedback information according to the codebook of the feedback information.

The processing module 102 is further configured to determine a PUCCH resource according to PUCCH resource indication information.

The sending module 103 is configured to send, on the PUCCH resource in the uplink subframe, encoded feedback information.

In this embodiment, the receiving module 101 can receive the scheduling information that is sent by the base station by using the downlink control channel, where the downlink control channel belongs to the preconfigured downlink subframe set, and can further receive the downlink data that is on the downlink data channel and that is scheduled according to the scheduling information. The processing module 102 determines the uplink subframe according to the downlink data, where the uplink subframe is used to send the feedback information, where the preconfigured downlink subframe set is a set of downlink subframes that are associated with the uplink subframe and that are of all carriers configured for the UE by the base station. The processing module 102 determines the codebook of the feedback information, performs channel encoding on the feedback information according to the codebook of the feedback information, and determines the PUCCH resource according to the PUCCH resource indication information. The sending module 103 sends, on the PUCCH resource in the uplink subframe, the encoded feedback information. The processing module 102 can determine an ACK/NACK codebook, and select, according to a bit quantity of the ACK/NACK, a PUCCH resource suitable for the bit quantity to transmit feedback information. All or most of the feedback information is an ACK, thereby avoiding relatively low PUCCH resource utilization.

Optionally, in some embodiments of the present disclosure, the processing module 102 is specifically configured to:

determine a first codebook according to a DAI accumulation indication, where the DAI accumulation indication is located in each piece of scheduling information of a real-time scheduled downlink subframe subset, a value of the DAI accumulation indication is accumulatively counted according to a sequence of precedence of carriers over subframes in the real-time scheduled downlink subframe subset, the first codebook corresponds to the real-time scheduled downlink subframe subset, and the real-time scheduled downlink subframe subset is a set of downlink subframes that are currently actually scheduled and that are in the preconfigured downlink subframe set.

Optionally, in some embodiments of the present disclosure, the processing module 102 is specifically configured to:

determine the first codebook according to the DAI accumulation indication and a DAI total quantity indication, where the DAI total quantity indication is used to indicate a quantity of downlink subframes in the real-time scheduled downlink subframe subset.

Optionally, in some embodiments of the present disclosure, the processing module 102 is specifically configured to:

determine the first codebook according to a first status of the PUCCH resource indication information and the DAI accumulation indication.

Optionally, in some embodiments of the present disclosure, the processing module 102 is specifically configured to:

determine a preconfigured PUCCH resource set in the uplink subframe; and determine the PUCCH resource in the resource set according to a bit quantity of the first codebook and the PUCCH resource indication information.

Optionally, in some embodiments of the present disclosure, the processing module 102 is specifically configured to:

when the bit quantity of the first codebook is greater than or equal to a preset threshold, determine the PUCCH resource in the resource set according to the bit quantity of the first codebook, a bit quantity of a CRC, and the PUCCH resource indication information; and/or when the bit quantity of the first codebook is less than a preset threshold, determine the PUCCH resource in the resource set according to the bit quantity of the first codebook and the PUCCH resource indication information.

Optionally, in some embodiments of the present disclosure, the processing module 102 is specifically configured to:

determine a bit capacity interval according to the bit quantity of the first codebook and the bit quantity of the CRC; and determine the PUCCH resource in the resource set according to the bit capacity interval and the PUCCH resource indication information.

Optionally, in some embodiments of the present disclosure, the processing module 102 is specifically configured to:

determine a bit capacity interval according to the bit quantity of the first codebook; and determine the PUCCH resource in the resource set according to the bit capacity interval and the PUCCH resource indication information.

Optionally, in some embodiments of the present disclosure, the codebook of the feedback information is a second codebook, and the processing module 102 is specifically configured to:

determine a preconfigured downlink subframe subset, where the preconfigured downlink subframe subset belongs to the preconfigured downlink subframe set; and determine the second codebook according to the preconfigured downlink subframe subset.

Optionally, in some embodiments of the present disclosure, the processing module 102 is specifically configured to:

determine the second codebook according to a second status of the PUCCH resource indication information and the preconfigured downlink subframe subset.

Optionally, in some embodiments of the present disclosure, the processing module 102 is specifically configured to:

determine the PUCCH resource according to the PUCCH resource indication information and the preconfigured downlink subframe subset.

Optionally, in some embodiments of the present disclosure, the processing module 102 is specifically configured to:

determine the PUCCH resource according to the PUCCH resource indication information and a DAI total quantity indication.

It should be noted that during actual application, a function of the receiving module 101 may be implemented by a receiving apparatus, a function of the processing module 102 may be implemented by a processor, and a function of the sending module 103 may be implemented by a sending apparatus.

Figure 2:
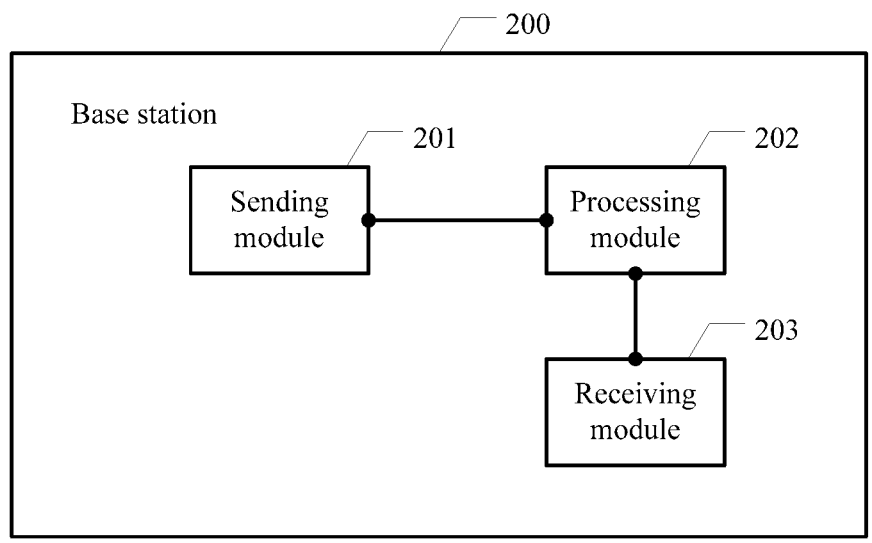
FIG. 2 is a schematic structural diagram of a base station according to an embodiment of the present disclosure.

The following describes a base station for implementing a feedback information receiving method in the embodiments of the present disclosure. Referring to FIG. 2, an embodiment of a base station in an embodiment of the present disclosure includes a sending module 201, a processing module 202, and a receiving module 203.

The sending module 201 is configured to: send scheduling information to user equipment UE by using a downlink control channel, and send downlink data by using a downlink data channel, where the downlink control channel belongs to a preconfigured downlink subframe set, and the scheduling information is used to schedule the downlink data.

The processing module 202 is configured to determine an uplink subframe, where the uplink subframe is used by UE to send feedback information corresponding to the downlink data, and the preconfigured downlink subframe set is a set of downlink subframes that are associated with the uplink subframe and that are of all carriers configured for the UE by the base station.

The processing module 202 is further configured to determine a PUCCH resource.

The receiving module 203 is configured to receive, on the PUCCH resource in the uplink subframe, encoded feedback information that is sent by the UE.

The processing module 202 is further configured to decode the received encoded feedback information, to obtain a codebook of the feedback information.

Optionally, in some embodiments of the present disclosure, the scheduling information includes a DAI accumulation indication, where the DAI accumulation indication is used to instruct the UE to determine a first codebook, the DAI accumulation indication is located in each piece of scheduling information of a real-time scheduled downlink subframe subset, a value of the DAI accumulation indication is accumulatively counted according to a sequence of precedence of carriers over subframes in the real-time scheduled downlink subframe subset, the first codebook corresponds to the real-time scheduled downlink subframe subset, and the real-time scheduled downlink subframe subset is a set of downlink subframes that are currently actually scheduled and that are in the preconfigured downlink subframe set.

Optionally, in some embodiments of the present disclosure, the scheduling information may further include a DAI total quantity indication, and the DAI total quantity indication is used to indicate a quantity of downlink subframes in the real-time scheduled downlink subframe subset.

Optionally, in some embodiments of the present disclosure, the scheduling information includes PUCCH resource indication information, the PUCCH resource indication information is a first status of the PUCCH resource indication information, and the first status of the PUCCH resource indication information is used to instruct the UE to determine the first codebook.

Optionally, in some embodiments of the present disclosure, the scheduling information includes PUCCH resource indication information, and the PUCCH resource indication information and a bit quantity of the first codebook are used to indicate the PUCCH resource.

Optionally, in some embodiments of the present disclosure, the processing module 202 is specifically configured to:

determine a preconfigured downlink subframe subset, where the preconfigured downlink subframe subset belongs to the preconfigured downlink subframe set, the scheduling information belongs to the preconfigured downlink subframe subset, and the preconfigured downlink subframe subset is used by the UE to determine a second codebook.

Optionally, in some embodiments of the present disclosure, the scheduling information includes PUCCH resource indication information, the PUCCH resource indication information is a second status of the PUCCH resource indication information, and the second status of the PUCCH resource indication information is used to instruct the UE to determine the second codebook.

Optionally, in some embodiments of the present disclosure, the scheduling information includes PUCCH resource indication information, and the PUCCH resource indication information and the preconfigured downlink subframe subset are used to instruct the UE to determine the PUCCH resource.

Optionally, in some embodiments of the present disclosure, the scheduling information includes PUCCH resource indication information and a DAI total quantity indication, and the DAI total quantity indication is used to instruct the UE to determine the PUCCH resource.

It should be noted that during actual application, a function of the processing module 202 may be implemented by a processor, a function of the receiving module 203 may be implemented by a receiving apparatus, and a function of the sending module 201 may be implemented by a sending apparatus.

The following briefly describes a feedback information sending method in the prior art. When a base station configures M carriers in total for UE and the base station performs scheduling once in a preconfigured downlink subframe set of the M carriers, there are N downlink subframes in total in the preconfigured downlink subframe set. When the base station sends scheduling information and downlink data in the N downlink subframes of the M carriers, the UE may determine an uplink subframe corresponding to the downlink data, so as to send an ACK/NACK corresponding to the downlink data.

In FDD, after receiving a PDSCH in a subframe n-4, the UE feeds back an ACK/NACK in a subframe n.

In TDD, for a correspondence between the PDSCH and the ACK/NACK, refer to Table 1. When the UE correctly decodes downlink data that is received by the UE in a downlink subframe set whose subframe number is n-k, where k belongs to K, the UE feeds back an ACK/NACK in an uplink subframe n. For example, an uplink and downlink configuration is 1, and a downlink subframe set K={7,6}. When the UE correctly decodes downlink data in two downlink subframes (n-7) and (n-6), the UE feeds back an ACK/NACK in an uplink subframe 2. Specifically, n-7 is a downlink subframe 5, and n-6 is a downlink subframe 6.

The UE generates an ACK/NACK codebook according to the N downlink subframes on the M carriers, where a bit quantity of the codebook is N, and performs channel encoding on an ACK/NACK according to the ACK/NACK codebook. The UE determines a PUCCH resource in the uplink subframe according to PUCCH resource indication information in the scheduling information, and sends encoded feedback information on the PUCCH resource.

It should be noted that in a TDD system, a carrier may include a downlink subframe, an uplink subframe, and a special subframe. Downlink data may be transmitted in a downlink subframe part (DwPTS) of the special subframe, and uplink data cannot be transmitted in an uplink subframe part (UpPTS) of the special subframe. Therefore, the special subframe may be considered as a downlink subframe.

TABLE 1

| Uplink and downlink configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

However, when a quantity of downlink subframes corresponding to the scheduling information exceeds a capacity of a PUCCH format 3, and the PUCCH format 3 is PF3, the base station configures a PUCCH resource of a new format for the UE to send an ACK/NACK. The new format is the PF3 format that can carry multiple resource blocks (RB), or may occupy one RB but capacity is expanded by compromising a code division multiplexing capability of the current PF3. In the prior art, ACK/NACK information is fed back by using a PUCCH resource that can carry a largest quantity of RBs, to ensure that all services are supported. When downlink data scheduled by a service occupies only a relatively small part of the N downlink subframes of the M carriers that are configured for the UE, a relatively large quantity of NACKS are filled, due to no scheduling, in ACK/NACK codebooks that are generated by the UE according to the N downlink subframes of the M carriers. As a result, PUCCH resource utilization is low.

To reduce redundant information in the feedback information, in the present disclosure, multiple manners may be used to determine the codebook of the feedback information. For details, refer to the following embodiments.

Figure 3:
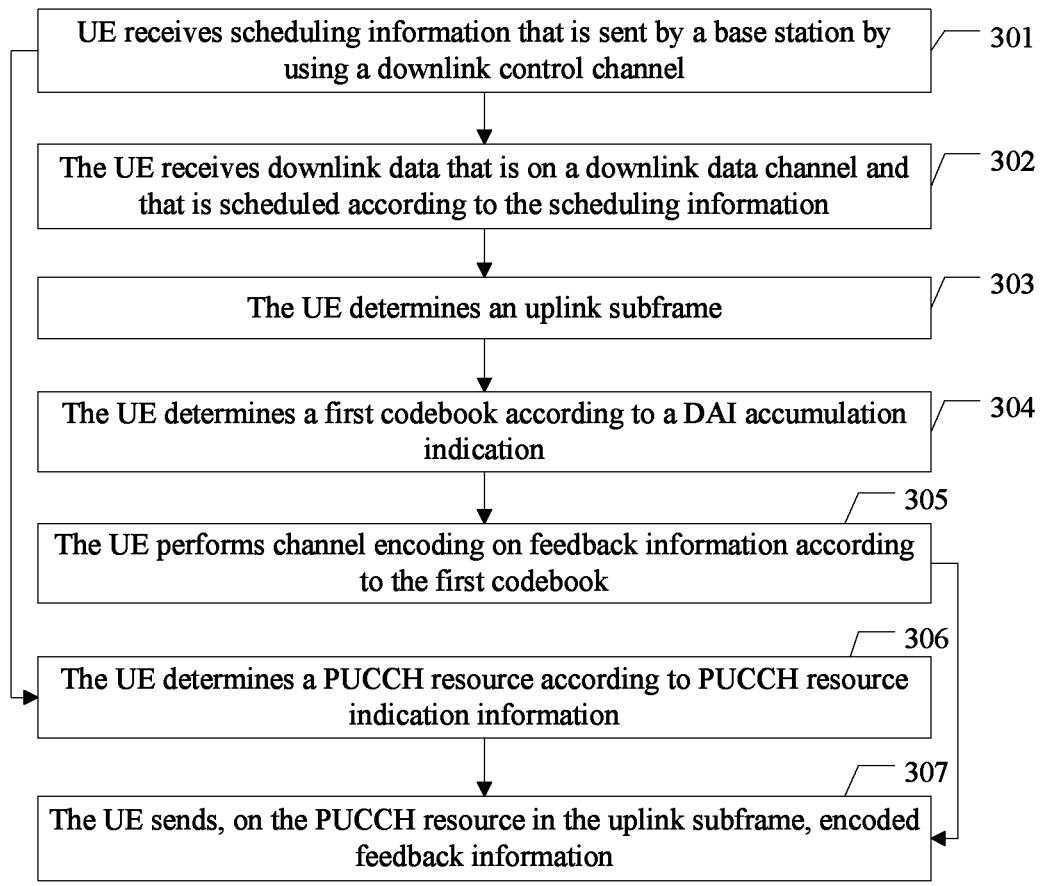
FIG. 3 is a schematic flowchart of a feedback information sending method according to an embodiment of the present disclosure.

1. The codebook of the feedback information is determined according to a DAI accumulation indication. Referring to FIG. 3, an embodiment of a feedback information sending method in an embodiment of the present disclosure includes the following steps.

301. UE receives scheduling information that is sent by a base station by using a downlink control channel.

In this embodiment, the base station configures multiple carriers for the UE by using radio resource control (RRC) signaling, and sends, by using a downlink control channel, the scheduling information in a preconfigured downlink subframe set corresponding to the multiple carriers, and the UE may receive the scheduling information. The preconfigured downlink subframe set corresponds to an uplink subframe by using which an ACK/NACK is sent, and includes all downlink subframes that are associated with the uplink subframe and that are of the multiple carriers. The downlink control channel may be a PDCCH or an EPDCCH. A carrier type may be frequency division duplex (FDD) or time division duplex (TDD). The TDD may include TDD CA in which uplink and downlink configurations are the same, or may include TDD CA in which uplink and downlink configurations are different.

302. The UE receives downlink data that is on a downlink data channel and that is scheduled according to the scheduling information.

The downlink data channel is a PDSCH. After receiving the scheduling information, the UE may schedule the PDSCH according to the scheduling information, and receive the downlink data on the PDSCH. Generally, the downlink control channel and the PDSCH scheduled by the downlink control channel are in a same subframe. It should be noted that the downlink data may be scheduled by an independent downlink control channel, may be scheduled by a centralized downlink control channel, or may be scheduled by a combination thereof. This is not limited herein.

303. The UE determines an uplink subframe.

After receiving the downlink data, the UE may determine the uplink subframe according to a downlink subframe in which the downlink data is located and the correspondence shown in Table 1. The uplink subframe is used to send feedback information of the downlink data, and the feedback information includes an ACK/NACK. This is not limited herein.

304. The UE determines a first codebook according to a DAI accumulation indication.

In this embodiment, the first codebook is a first type of ACK/NACK codebook and corresponds to a real-time scheduled downlink subframe subset. The real-time scheduled downlink subframe subset is a set of downlink subframes that are currently actually scheduled and that are in the preconfigured downlink subframe set. The scheduling information and the downlink data separately correspond to the real-time scheduled downlink subframe subset.

During actual application, the determining, by the UE, a first codebook according to a DAI accumulation indication may be specifically implemented in the following manner: determining, by the UE, the first codebook according to the DAI accumulation indication and a DAI total quantity indication.

The DAI accumulation indication and the DAI total quantity indication belong to the scheduling information. A value of the DAI accumulation indication is accumulatively counted according to a sequence of precedence of carriers over subframes in the real-time scheduled downlink subframe subset. The DAI total quantity indication is used to indicate a quantity of downlink subframes in the real-time scheduled downlink subframe subset. The DAI accumulation indication and the DAI total quantity indication may be independent fields in the scheduling information. Alternatively, the DAI accumulation indication may be in the scheduling information. However, the DAI total quantity indication may be independent of the foregoing scheduling information that is used to schedule the downlink data. In a solution, the DAI total quantity indication is independent physical signaling, for example, independent control information, and the control information does not carry a function of scheduling the downlink data. In another solution, the DAI total quantity indication may exist in partial scheduling information of the foregoing scheduling information that is used to schedule the downlink data, for example, exist in one of multiple pieces of scheduling information of multiple carriers that correspond to a subframe. Alternatively, the DAI total quantity indication is used to indicate a bit quantity of the first codebook, and may also be referred to as a magnitude of the codebook or a size of the codebook. The magnitude of the codebook is less than a bit quantity of a HARQ-ACK corresponding to the preconfigured downlink subframe set, but is greater than or equal to the quantity of downlink subframes or a quantity of transmission blocks in the real-time scheduled downlink subframe subset. When the magnitude of the codebook is greater than the quantity of downlink subframes or the quantity of transmission blocks in the real-time scheduled downlink subframe subset, both UE and the base station determine that at least one NACK is filled at an end of the codebook. A specific quantity of filled NACKs is obtained by subtracting, from a pre-estimated bit quantity of the codebook, a quantity of downlink subframes or transmission blocks in which the downlink data is actually scheduled and that is in the real-time scheduled downlink subframe subset.

On a TDD carrier, when the downlink control channel is a PDCCH, the DAI accumulation indication is a DL_DAI field. A DAI total quantity may be a newly added field, or may be a time division multiplexing transmit power control (TPC) field, or another multiplexing field. This is not limited herein. When the downlink control channel is an EPDCCH, the DAI accumulation indication is a DL_DAI field, and the DAI total quantity indication may be a newly added field, or all or a part of a multiplexing TPC field. This is not limited herein.

On an FDD carrier, when the downlink control channel is a PDCCH, the DAI accumulation indication or the DAI total quantity indication may be a newly added bit on the PDCCH, or may be a TPC field used to indicate a PUCCH resource during time division multiplexing, or another multiplexing field. This is not limited herein. When the downlink control channel is an EPDCCH, the DAI accumulation indication or the DAI total quantity indication may be a newly added bit on the PDCCH, or may be a TPC field used to indicate a PUCCH resource during time division multiplexing, or another multiplexing field. This is not limited herein.

In this embodiment, the UE may determine the DAI total quantity in three manners. In a first manner, the UE determines a DAI total quantity of each subframe according to a quantity of scheduled carriers corresponding to each downlink subframe in the real-time scheduled downlink subframe subset. When the DAI total quantity indication is stored in a 2-bit field, a modulo operation needs to be performed on the quantity of scheduled carriers, and a modulus is 4.

In a second manner, the UE determines a value of a DAI total quantity indication of each subframe in the real-time scheduled downlink subframe subset according to the DAI accumulation indication. A value of a DAI total quantity indication of the first downlink subframe is a quantity of scheduled carriers corresponding to the first downlink subframe, a value of a DAI total quantity indication of the second downlink subframe is a sum of the quantity of scheduled carriers corresponding to the first downlink subframe and a quantity of scheduled carriers corresponding to the second downlink subframe, and a value of a DAI total quantity indication of the third downlink subframe is a sum of the quantity of scheduled carriers corresponding to the first downlink subframe, the quantity of scheduled carriers corresponding to the second downlink subframe, and a quantity of scheduled carriers corresponding to the third downlink subframe. By analogy, a DAI total quantity indication corresponding to each downlink subframe is obtained. When a value of the DAI total quantity indication is stored in a 2-bit field, a modulo operation needs to be performed on a quantity of scheduled carriers, and a modulus is 4. It may be understood that when a field in which the DAI total quantity indication is stored is h, a modulus is $2^h$.

In a third manner, the DAI total quantity indication is used to indicate an end subframe in the real-time scheduled downlink subframe subset, or used to indicate an end subframe of multiple subframes with same subframe numbers in the real-time scheduled downlink subframe subset. For example, the DAI total quantity indication is 1 bit. If the DAI total quantity indication indicates an end subframe, a status of the bit is '1'. If the DAI total quantity indication does not indicate an end subframe, a status of the bit is '0'. For example, the DAI total quantity indication is 2 bits. If the DAI total quantity indication indicates the last three subframes, statuses of corresponding DAI total quantity indications from end to beginning are respectively 11, 30, and 01. If the DAI total quantity indication does not indicate the last three subframes, the statuses of the corresponding DAI total quantity indications are all '00'. A manner of determining a status of a DAI total quantity indication of another bit quantity is similar thereto.

305. The UE performs channel encoding on feedback information according to the first codebook.

Specifically, an encoding method may be linear block code, convolutional code, or Turbo product code. If the encoding method is the linear block code, for example, Reed Muller (RM) code, generally there is no need to add a CRC before the encoding. If the encoding method is the convolutional code or the Turbo product code, the CRC may be or may not be added before the encoding. This is not limited herein.

Specifically, in some embodiments of the present disclosure, the performing, by the UE, channel encoding on feedback information according to the first codebook may be specifically implemented in the following manners: When the first codebook is less than a preset codebook value, the UE may perform channel encoding on the first codebook by using the RM. When the first codebook is greater than or equal to a preset codebook value, the UE may add the CRC after the first codebook, and then perform, by using the convolutional code or the Turbo product code, channel encoding on the first codebook to which the CRC has been added. The preset codebook value may be generally set to 23, or may be set to another value. This is not limited herein.

306. The UE determines a PUCCH resource according to PUCCH resource indication information.

The PUCCH resource indication information is in a one-to-one correspondence with the PUCCH resource. The base station may configure a PUCCH resource set for the UE by using RRC signaling, and the UE may determine, in the PUCCH resource set according to the PUCCH resource indication information, the PUCCH resource that is used to send an ACK/NACK. PUCCH formats of PUCCH resources in the PUCCH resource set may be the same, or may be different. This is not limited herein. The PUCCH resource indication information belongs to the scheduling information, and may be a newly added bit or a TPC field in the scheduling information. When a type of a carrier configured for the UE is FDD, the PUCCH resource indication information is located on a downlink control channel of a secondary carrier, and cannot be located on a downlink control channel of a primary carrier. When a type of a carrier configured for the UE is TDD, the PUCCH resource indication information is located on a downlink control channel of a secondary carrier, or on a downlink control channel whose DAI accumulation indication value is greater than 1 in a primary carrier.

307. The UE sends, on the PUCCH resource in the uplink subframe, encoded feedback information.

After determining the PUCCH resource, the UE sends the encoded feedback information on the PUCCH resource.

In this embodiment of the present disclosure, the UE may determine the first codebook according to the DAI accumulation indication, and select, according to a bit quantity of the first codebook, a PUCCH resource suitable for the bit quantity to transmit the feedback information. All or most of the feedback information is an ACK, and NACKs that are in the feedback information and that are not scheduled are far less than NACKs that are not scheduled in the prior art, thereby avoiding low PUCCH resource utilization.

Optionally, in some embodiments of the present disclosure, the determining, by the UE, a PUCCH resource according to PUCCH resource indication information may be specifically implemented in the following manner: determining, by the UE, a preconfigured PUCCH resource set in the uplink subframe; and determining, by the UE, the PUCCH resource in the resource set according to a bit quantity of the first codebook and the PUCCH resource indication information.

In this embodiment, the base station may configure a PUCCH resource set for the UE, and the UE may first determine a PUCCH resource subset in the PUCCH resource set according to a status of the PUCCH resource indication information, and then determine the PUCCH resource in the PUCCH resource subset according to the bit quantity of the first codebook. Alternatively, the UE may first determine a PUCCH resource subset in the PUCCH resource set according to the bit quantity of the first codebook, and then determine the PUCCH resource according to a status of the PUCCH resource indication information. The PUCCH resource set may include PUCCH resources of multiple different PUCCH formats.

Optionally, in some embodiments of the present disclosure, the determining, by the UE, the PUCCH resource in the resource set according to a bit quantity of the first codebook and the PUCCH resource indication information may be specifically implemented in the following manners: when the bit quantity of the first codebook is greater than or equal to a preset threshold, determining, by the UE, the PUCCH resource in the resource set according to the bit quantity of the first codebook, a bit quantity of a CRC, and the PUCCH resource indication information; or when the bit quantity of the first codebook is less than a preset threshold, determining, by the UE, the PUCCH resource in the resource set according to the bit quantity of the first codebook and the PUCCH resource indication information.

Specifically, the preset threshold may be determined according to bits that can be accommodated in the PUCCH format, and is generally set to 23. When the bit quantity of the first codebook is greater than or equal to 23, the feedback information generated by the UE includes the first codebook and the CRC. The UE may determine a PUCCH resource subset in the resource set according to the bit quantity of the first codebook and the bit quantity of the CRC, and then determine, in the PUCCH resource subset according to the PUCCH resource indication information, the PUCCH resource used to send the feedback information; or determine a PUCCH resource subset in a PUCCH resource set according to the PUCCH resource indication information, and then determine the PUCCH resource in the PUCCH resource subset according to the bit quantity of the first codebook and the bit quantity of the CRC. A quantity of the bits that can be accommodated in the PUCCH format of the PUCCH resource may be 22, 44, or 64, or may be another value. This is not limited herein.

When the bit quantity of the first codebook is less than the preset threshold, the feedback information generated by the UE does not include the CRC, and therefore the UE determines the PUCCH resource in the resource set according to the bit quantity of the first codebook and the PUCCH resource indication information.

Optionally, in some embodiments of the present disclosure, the determining, by the UE, the PUCCH resource in the resource set according to the bit quantity of the first codebook and the PUCCH resource indication information may be specifically implemented in the following manner: determining, by the UE, a bit capacity interval according to the bit quantity of the first codebook; and determining, by the UE, the PUCCH resource in the resource set according to the bit capacity interval and the PUCCH resource indication information.

The PUCCH format of the PUCCH resource corresponds to the bit capacity interval, and the PUCCH format of the PUCCH resource includes at least one RB. The bit capacity interval may be predefined, or may be configured by the base station for the UE by using RRC signaling.

For example, the base station configures a PUCCH resource set and a bit capacity interval for the UE. The PUCCH resource set includes multiple PUCCH resources. A PUCCH resource format that corresponds to an interval of a bit capacity from 23 to 44 is PF3 with two RBs, a PUCCH resource format that corresponds to an interval from 45 to 64 is PF3 with three RBs, and a PUCCH resource format that corresponds to an interval from 65 to 128 is a new PUSCH-based format.

The foregoing embodiment may further be extended to a case of channel state information (CSI). Generally, a period of the CSI that needs to be fed back by the UE and a specific uplink subframe are preconfigured by the base station. Therefore, for the foregoing uplink subframe by using which an ACK/NACK is fed back, sometime the CSI also needs to be fed back in the uplink subframe. That is, if there is no CSI feedback configuration in a current uplink subframe, the UE feeds back an ACK/NACK in the uplink subframe, as described in the foregoing embodiment. If there is a CSI feedback configuration in a current uplink subframe, the UE needs to feed back an ACK/NACK and the CSI together in the uplink subframe. When the ACK/NACK and the CSI are fed back in the uplink subframe, the foregoing method for determining the PUCCH resource may further be extended to a case in which the ACK/NACK and the CSI are fed back together. Generally, a bit quantity of the CSI is preconfigured according to, for example, a configuration of the base station, and the UE may determine the PUCCH resource according to the PUCCH resource indication information, the bit quantity of the foregoing ACK/NACK codebook, and the bit quantity of the CSI. A specific method is described above, and details are not described herein again.

For ease of understanding, the following describes, in detail by using a specific application scenario, the feedback information sending method in the embodiment shown in FIG. 1.

A base station configures 10 carriers for UE, and the base station sends scheduling information and downlink data in a subframe 4 of a carrier 1 to a carrier 7, a subframe 5 of the carrier 1, a carrier 3, and a carrier 5, a subframe 6 of the carrier 1 to a carrier 6, and a subframe 8 of the carrier 1 to the carrier 5. It may be determined, according to downlink subframes 4, 5, 6, and 8 corresponding to the downlink data, that an uplink subframe by using which an ACK/NACK is sent is an uplink subframe 2.

The UE receives the downlink data in the downlink subframe according to the scheduling information. When receiving the downlink data in the downlink subframe and successfully decoding the downlink data, the UE generates an ACK represented by a binary character 1. Otherwise, when the decoding fails, the UE generates a NACK represented by a binary character 0. A DAI accumulation indication is accumulatively counted according to a sequence of precedence of carriers over subframes. Referring to Table 2, '00', '01', '10', and '11' in Table 2 respectively indicate that values of the DAI accumulation indication are 1, 2, 3, and 4.

TABLE 2

| Carrier | Subframe | | | |
| --- | --- | --- | --- | --- |
| | 4 | 5 | 6 | 8 |
| 1 | 00 | 11 | 10 | 00 |
| 2 | 01 | | 11 | 01 |
| 3 | 10 | 00 | 00 | 10 |
| 4 | 11 | | 01 | 11 |
| 5 | 00 | 01 | 10 | 00 |
| 6 | 01 | | 11 | |
| 7 | 10 | | | |
| 8 | | | | |
| 9 | | | | |
| 10 | | | | |

Quantities of carriers indicated by DAI total quantities that correspond to single subframes are respectively 7, 3, 6, and 5. Then, a modulo operation is performed on the quantities of carriers, and a modulus is 4. The DAI total quantities 3, 3, 2, and 1 are obtained. For example, a modulo formula is $Y=[(X-1) \mod 4]+1$. X is an actual counter, such as 7, 3, 6, and 5 described above. Y is a final value obtained after the modulo operation, for example, the foregoing described 3, 3, 2, and 1, which are represented by '10', '10', '01', and '00' in a DAI total quantity indication field. Refer to a DAI total quantity 1 in Table 3.

TABLE 3

| DAI total quantity | Subframe | | | |
| --- | --- | --- | --- | --- |
| | 4 | 5 | 6 | 8 |
| 1 | 10 | 10 | 01 | 00 |
| 2 | 10 | 01 | 11 | 00 |

Optionally, the DAI total quantity may alternatively be determined according to a DAI accumulation indication corresponding to an $n^{th}$ carrier. Refer to a DAI total quantity 2 in Table 3.

The UE may determine an ACK/NACK codebook corresponding to downlink data in Table 2 according to a DAI accumulation indication and a DAI total quantity indication, and determine that a bit quantity of the ACK/NACK codebook is 21. Because 21 is less than 23, the UE does not need to add a CRC, and directly performs channel encoding on the ACK/NACK according to the ACK/NACK codebook.

It is assumed that a quantity of downlink subframes corresponding to the downlink data is Z. If Z is greater than or equal to 23, the UE needs to add an 8-bit CRC code after the ACK/NACK codebook, that is, a bit quantity of the codebook of feedback information is Z+8, and perform channel encoding on the ACK/NACK and the CRC code.

Referring to Table 4, a base station configures, for UE, a PUCCH resource set including nine PUCCH resources: a PUCCH 1 to a PUCCH 9. A bit capacity interval 1 whose range is [23,44] corresponds to a PUCCH format including two RBs, that is, PUCCH formats of a PUCCH 1, a PUCCH 4, and a PUCCH 7 each include two RBs. A bit capacity interval 2 whose range is [45,64] corresponds to a PUCCH format including three RBs, that is, PUCCH formats of a PUCCH 2, a PUCCH 5, and a PUCCH 8 each include three RBs. A bit capacity interval 3 whose range is [65,128] corresponds to a PUCCH format including four or five RBs, that is, PUCCH formats of a PUCCH 3, a PUCCH 6, and a PUCCH 9 each include four or five RBs. A PUCCH resource indication and a bit capacity interval separately correspond to different PUCCH resource subsets.

It is assumed that a bit quantity of the first codebook is 40 bits, and 40 ∈[23,44]. A corresponding bit capacity interval is the bit capacity interval 1. When a value of the PUCCH indication information is '01', the UE selects the PUCCH 1 from the PUCCH resource set according to '01' and the bit capacity interval 2, and sends encoded feedback information on the PUCCH 1.

TABLE 4

| Indication information | Bit capacity interval | | |
|---|---|---|---|
| | 1 | 2 | 3 |
| 01 | 1 | 2 | 3 |
| 10 | 4 | 5 | 6 |
| 11 | 7 | 8 | 9 |

Figure 4:
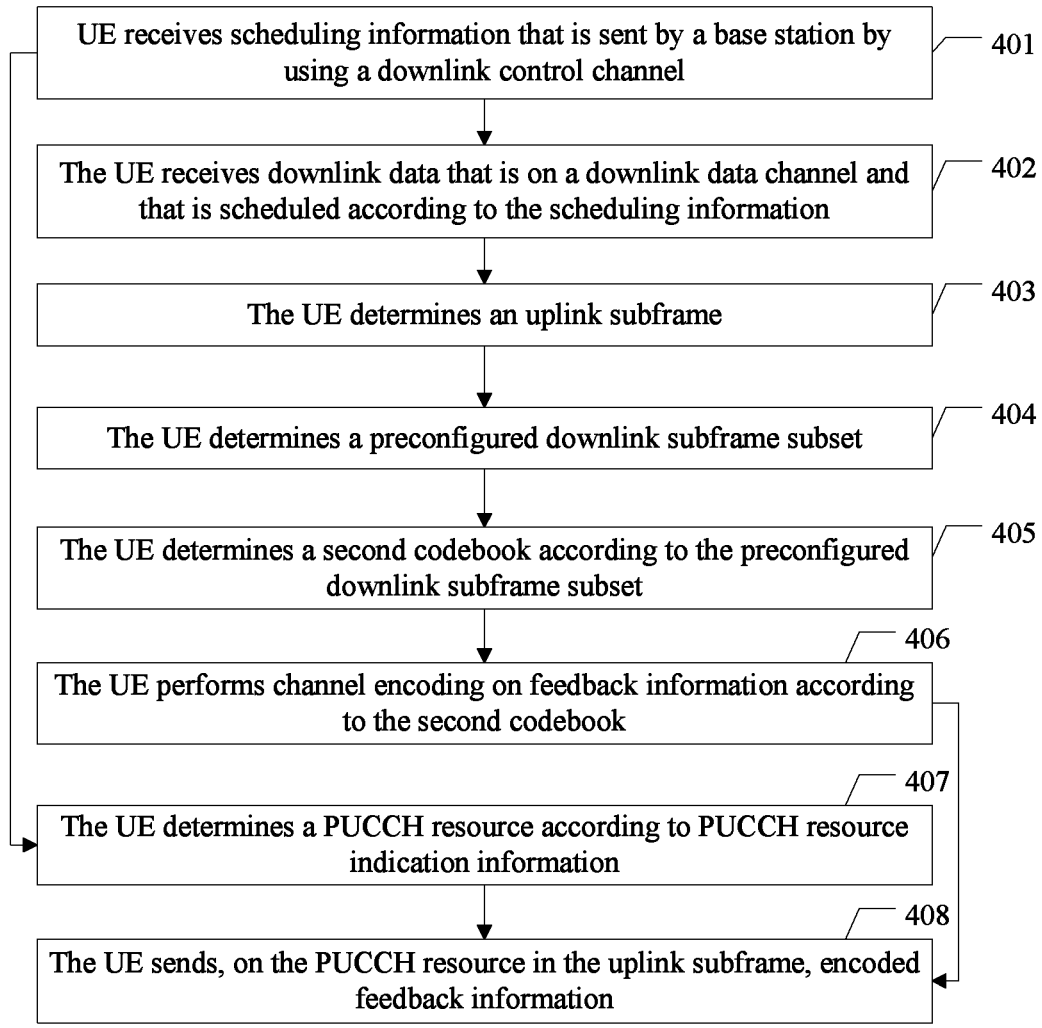
FIG. 4 is another schematic flowchart of a feedback information sending method according to an embodiment of the present disclosure.

2. The codebook of the feedback information is determined according to a downlink subframe subset. Referring to FIG. 4, another embodiment of a feedback information sending method in an embodiment of the present disclosure includes the following steps.

401. UE receives scheduling information that is sent by a base station by using a downlink control channel, where the downlink control channel belongs to a preconfigured downlink subframe set.

402. The UE receives downlink data that is on a downlink data channel and that is scheduled according to the scheduling information.

403. The UE determines an uplink subframe.

In this embodiment, step 401 to step 403 are similar to step 101 to step 103 in the embodiment shown in FIG. 1, and details are not described herein again.

404. The UE determines a preconfigured downlink subframe subset, where the preconfigured downlink subframe subset belongs to the preconfigured downlink subframe set.

The UE may determine the preconfigured downlink subframe subset in the preconfigured downlink subframe set. Optionally, the preconfigured downlink subframe subset corresponds to a carrier occupied by the scheduling information. Alternatively, the UE determines the preconfigured downlink subframe subset according to a subframe in which the received scheduling information is located. It should be noted that downlink subframes in all preconfigured downlink subframe subsets in the preconfigured downlink subframe set do not overlap with each other.

For example, the preconfigured downlink subframe set is subframes 4, 5, 6, and 8 of carriers 1 to 10. It is assumed that a carrier on which the scheduling information is located is in downlink subframes 4, 5, 6, and 8 of carriers 1 to 5. The UE may detect a preconfigured downlink subframe subset corresponding to the carriers 1 to 5, and determine that a bit quantity of the preconfigured downlink subframe subset is 5*4=20.

405. The UE determines a second codebook according to the preconfigured downlink subframe subset.

The UE sorts, according to a carrier-to-subframe or subframe-to-carrier sequence, ACKs/NACKs corresponding to the scheduling information. For a downlink subframe in which scheduling is not performed in the preconfigured downlink subframe subset, or for a downlink subframe in which the downlink data is not received, the UE fills 0 in the second codebook, so as to generate the second codebook. The second codebook corresponds to the preconfigured downlink subframe subset.

406. The UE performs channel encoding on feedback information according to the second codebook.

After determining the second codebook, the UE performs channel encoding on the feedback information according to the second codebook.

407. The UE determines a PUCCH resource according to PUCCH resource indication information.

The determining, by the UE, a PUCCH resource according to PUCCH resource indication information may be specifically implemented in multiple manners. Refer to the following optional embodiments.

Optionally, in some embodiments of the present disclosure, the UE determines the PUCCH resource according to the PUCCH resource indication information and the preconfigured downlink subframe subset.

Specifically, the PUCCH resource indication information and the preconfigured downlink subframe subset are in preconfigured correspondences with the PUCCH resource. The UE receives the PUCCH indication information, and may determine a PUCCH resource subset according to a status of the PUCCH resource indication information, and then determine the PUCCH resource in the PUCCH resource subset according to the preconfigured downlink subframe subset. Alternatively, the UE determines a PUCCH resource subset according to the preconfigured downlink subframe subset, and then determines the PUCCH resource in the PUCCH resource subset according to a status of the PUCCH resource indication information.

Optionally, in some embodiments of the present disclosure, the UE determines the PUCCH resource according to the PUCCH resource indication information and a DAI total quantity indication.

Specifically, in the embodiment shown in FIG. 3, the DAI total quantity indication is used to indicate a quantity of downlink subframes in a real-time scheduled downlink subframe subset. However, in this embodiment shown in FIG. 4, there is no need to indicate the quantity of the downlink subframes in the real-time scheduled downlink subframe subset. Therefore, the DAI total quantity indication stored in the field may be used to indicate the PUCCH resource. The PUCCH resource indication information and the DAI total quantity indication are in preconfigured correspondences with the PUCCH resource. When receiving the PUCCH indication information, the UE may determine a PUCCH resource subset according to a status of the PUCCH resource indication information, and then determine the PUCCH resource in the PUCCH resource subset according to the DAI total quantity indication. Alternatively, the UE determines a PUCCH resource subset according to the DAI total quantity indication, and then determines the PUCCH resource in the PUCCH resource subset according to a status of the PUCCH resource indication information.

408. The UE sends, on the PUCCH resource in the uplink subframe, encoded feedback information.

After determining the PUCCH resource in the uplink subframe, the UE sends the encoded feedback information on the PUCCH resource.

In this embodiment, when the base station performs scheduling in the preconfigured downlink subframe subset, the UE can determine the preconfigured downlink subframe subset. Both the base station and the UE can learn a bit quantity of the preconfigured downlink subframe subset, and the UE determines the PUCCH resource according to the second codebook fed back in the preconfigured downlink subframe subset. Because the bit quantity of the preconfigured downlink subframe subset is less than a bit quantity of the preconfigured downlink subframe set, in comparison with the prior art in which an ACK/NACK codebook is determined according to a preconfigured downlink subframe set, NACKs that are in the second codebook determined according to the present disclosure and that are not scheduled are less than NACKs in the ACK/NACK codebook in the prior art. The UE sends less invalid information to the base station according to the PUCCH resource determined by using the second codebook, thereby improving PUCCH resource utilization.

In addition, in this embodiment, even if the UE omits to check ACK information, the base station may start a HARQ mechanism according to the preconfigured downlink subframe subset. Therefore, a case in which the base station incorrectly obtains information is avoided.

Optionally, in another embodiment of the feedback information sending method in the embodiments of the present disclosure, the UE determines the second codebook according to a second status of the PUCCH resource indication information and the downlink subframe subset.

Specifically, when the UE receives the second status of the PUCCH resource indication information, the second status of the PUCCH resource indication information is used to indicate a codebook generation manner, and the second codebook corresponds to the downlink subframe subset.

For example, when the second status is 00, the UE may determine that a PUCCH resource subset corresponding to the scheduling information is 0a, 0b, and 0c. It is assumed that carriers corresponding to the scheduling information are 1 to 5. The UE may determine that the PUCCH resource is 0a.

Optionally, in another embodiment of the feedback information sending method of the embodiments of the present disclosure, the determining, by the UE, the PUCCH resource according to the PUCCH resource indication information may be specifically implemented in the following manner: determining, by the UE, the PUCCH resource according to the PUCCH resource indication information and a DAI total quantity indication, where the DAI total quantity indication is used to indicate a quantity of downlink subframes in the real-time scheduled downlink subframe subset.

In this embodiment, a bit quantity of the second codebook is determined by a bit quantity of the downlink subframe subset, and there is no need to use a DAI total quantity. The scheduling information still includes the DAI total quantity indication signaling, and the signaling may be used to select the PUCCH resource from the resource set indicated by the second status.

Optionally, when receiving the second status of the PUCCH resource indication information, the UE may use the DAI total quantity indication and the downlink subframe subset to jointly indicate the PUCCH resource.

Optionally, before performing channel encoding on the feedback information according to the second codebook, the UE does not need to add a CRC bit to the second codebook, because the second codebook in this case is a codebook corresponding to the preconfigured downlink subframe subset and is robuster than the first codebook that is determined based on the DAI. Moreover, in this case, if no CRC is added, overheads of the CRC may further be reduced, because the bit quantity of the second codebook is generally relatively small. In this case, in the embodiment of the first codebook, before encoding is performed, the CRC may always be added to the first codebook regardless of a bit quantity of the first codebook. Considering that a solution of determining the first codebook has a risk of missed check of a PDCCH, always adding the CRC can have a protection effect.

For ease of understanding, the following describes in detail the feedback information sending method in the embodiments of the present disclosure by using a specific application scenario.

A base station configures 15 carriers for UE, and the base station sends scheduling information and downlink data in a subframe 4 of a carrier 1 to a carrier 7, a subframe 5 of the carrier 1, a carrier 3, and a carrier 5, a subframe 6 of the carrier 1 to a carrier 6, and a subframe 8 of the carrier 1 to the carrier 5. It may be determined, according to downlink subframes 4, 5, 6, and 8 corresponding to the downlink data, that an uplink subframe by using which an ACK/NACK is sent is an uplink subframe 2. The UE may divide n downlink subframes of 10 carriers into multiple downlink subframe subsets, for example, a downlink subframe subset 1, a downlink subframe subset 2, and a downlink subframe subset 3. It is assumed that the downlink subframe subset 1 corresponds to downlink subframes 4, 5, 6, and 8 that are associated with the uplink subframe 2 and that are of the carrier 1 to the carrier 7; the downlink subframe subset 2 corresponds to downlink subframes 4, 5, 6, and 8 of carriers 8 to 10; and the downlink subframe subset 3 corresponds to downlink subframes 4, 5, 6, and 8 of carriers 11 to 15.

The UE may determine, according to the scheduling information, that the downlink subframe subset is the downlink subframe subset 1, and detect the downlink data in the downlink subframe subset 1 according to a DAI accumulation indication. When the UE has detected the downlink data in the downlink subframe subset, the UE generates an ACK represented by a binary character 1, or when the UE has not detected the downlink data, the UE generates a NACK represented by a binary character 0, so as to generate an ACK/NACK codebook and encode feedback information according to the codebook.

Referring to Table 5, a second status '00' of the PUCCH resource indication corresponds to three PUCCH resources (0a, 0b, and 0c). It is assumed that the UE determines that the downlink subframe subset is the downlink subframe subset 1, the UE may select a PUCCH resource 0a from the PUCCH resource set, to send the encoded feedback information.

TABLE 5

| Indication information | Downlink subframe subset | | |
|---|---|---|---|
| | 1 | 2 | 3 |
| 00 | 0a | 0b | 0c |

Figure 5:
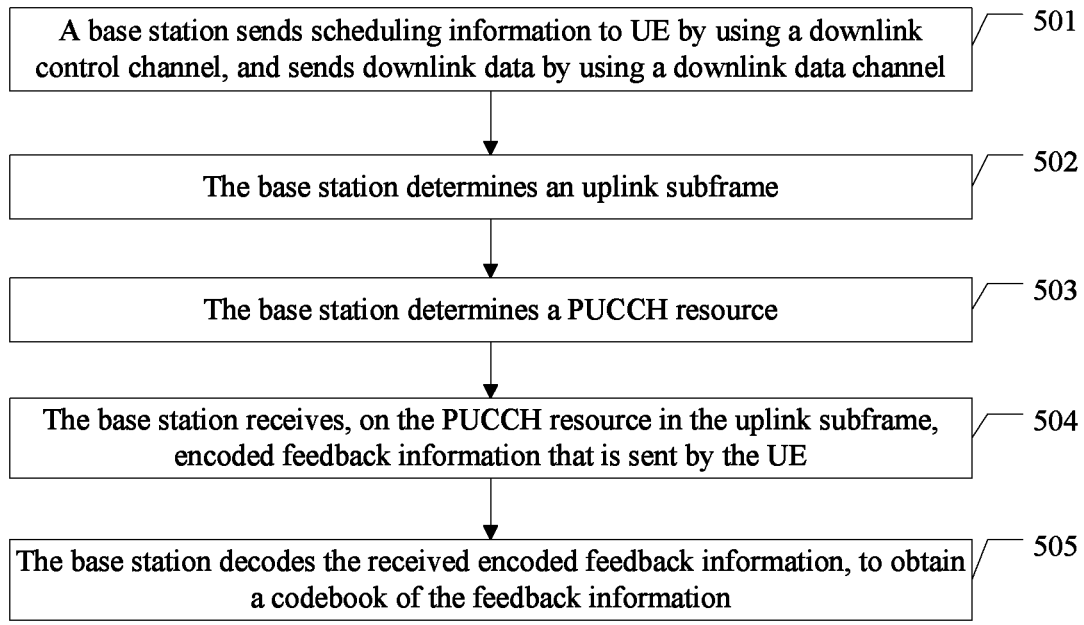
FIG. 5 is another schematic flowchart of a feedback information receiving method according to an embodiment of the present disclosure.

Referring to FIG. 5, another embodiment of a feedback information receiving method in an embodiment of the present disclosure includes the following steps.

501. A base station sends scheduling information to UE by using a downlink control channel, and sends downlink data by using a downlink data channel.

In this embodiment, the downlink control channel belongs to a preconfigured downlink subframe set, the downlink data is sent to the UE by the base station by using the downlink data channel (PDSCH), and the scheduling information is used to schedule the downlink data.

502. The base station determines an uplink subframe.

A correspondence between the downlink data channel and the uplink subframe by using which an ACK/NACK is fed back is preconfigured. Therefore, the base station may determine the uplink subframe by using the downlink data channel on which the downlink data is sent. The uplink subframe is used by the UE to send feedback information corresponding to the downlink data. The preconfigured downlink subframe set is a set of downlink subframes that are associated with the uplink subframe and that are of all carriers configured for the UE by the base station.

503. The base station determines a PUCCH resource.

The base station may configure one or more PUCCH resources for the UE by using the uplink subframe. After the UE determines the PUCCH resource, the base station may determine the PUCCH resource by means of interaction with the UE.

504. The base station receives, on the PUCCH resource in the uplink subframe, encoded feedback information that is sent by the UE.

After the UE determines the feedback information according to the scheduling information, encodes the feedback information, and sends the encoded feedback information to the base station, the base station receives, on the PUCCH resource, the encoded feedback information.

505. The base station decodes the received encoded feedback information, to obtain a codebook of the feedback information.

In this embodiment, the base station may send the scheduling information, and the UE may generate the feedback information according to the scheduling information, encode the feedback information, and send the encoded feedback information to the base station. The base station receives the encoded feedback information that is sent by the UE, and may decode the encoded feedback information, to obtain the codebook of the feedback information.

Optionally, in some embodiments of the present disclosure, the scheduling information includes a DAI accumulation indication, where the DAI accumulation indication is used to instruct the UE to determine a first codebook, the DAI accumulation indication is located in each piece of scheduling information of a real-time scheduled downlink subframe subset, a value of the DAI accumulation indication is accumulatively counted according to a sequence of precedence of carriers over subframes in the real-time scheduled downlink subframe subset, the first codebook corresponds to the real-time scheduled downlink subframe subset, and the real-time scheduled downlink subframe subset is a set of downlink subframes that are currently actually scheduled and that are in the preconfigured downlink subframe set.

Specifically, after the base station sends the DAI accumulation indication to the UE, the UE may determine the first codebook according to the DAI accumulation indication. For a process of determining the first codebook by the UE according to the DAI accumulation indication, refer to the method embodiment shown in FIG. 3.

Optionally, in some embodiments of the present disclosure, the scheduling information may further include a DAI total quantity indication, and the DAI total quantity indication is used to indicate a quantity of downlink subframes in the real-time scheduled downlink subframe subset.

Specifically, the scheduling information includes the DAI accumulation indication and the DAI total quantity indication, and after the base station sends the DAI accumulation indication and the DAI total quantity indication to the UE, the UE may determine the first codebook according to the DAI accumulation indication and the DAI total quantity indication. For a process of determining the first codebook by the UE according to the DAI accumulation indication and the DAI total quantity indication, refer to the method embodiment shown in FIG. 3.

Optionally, in some embodiments of the present disclosure, the scheduling information includes PUCCH resource indication information, the PUCCH resource indication information is a first status of the PUCCH resource indication information, and the first status of the PUCCH resource indication information is used to instruct the UE to determine the first codebook.

Specifically, the base station sends the PUCCH resource indication information to the UE, and when the PUCCH resource indication information is the first status, the UE determines the first codebook according to the DAI accumulation indication; or the UE determines the first codebook according to the DAI accumulation indication and the DAI total quantity indication.

Optionally, in some embodiments of the present disclosure, the scheduling information includes PUCCH resource indication information, and the PUCCH resource indication information and a bit quantity of the first codebook are used to indicate the PUCCH resource.

Specifically, after the base station sends the PUCCH resource indication information to the UE, and the PUCCH resource indication information is the first status, the UE may determine the first codebook according to the first status of the PUCCH resource indication information, and obtain the bit quantity of the first codebook, so that the UE may determine the PUCCH resource in a preconfigured PUCCH resource set according to the PUCCH resource indication information and the bit quantity of the first codebook.

Optionally, in some embodiments of the present disclosure, the method further includes: determining, by the base station, a preconfigured downlink subframe subset, where the preconfigured downlink subframe subset belongs to the preconfigured downlink subframe set, the scheduling information belongs to the preconfigured downlink subframe subset, and the preconfigured downlink subframe subset is used by the UE to determine a second codebook.

Specifically, the base station may determine the preconfigured downlink subframe subset in the preconfigured downlink subframe set, and send the scheduling information to the UE in the preconfigured downlink subframe subset. The UE may determine the preconfigured downlink subframe subset according to a carrier or a subframe corresponding to the scheduling information, and determine the second codebook according to the preconfigured downlink subframe subset. For a process of determining the second codebook by the UE according to the preconfigured downlink subframe subset, refer to the method embodiment shown in FIG. 4.

Optionally, in some embodiments of the present disclosure, the scheduling information includes PUCCH resource indication information, the PUCCH resource indication information is a second status of the PUCCH resource indication information, and the second status of the PUCCH resource indication information is used to instruct the UE to determine the second codebook.

Specifically, after the base station determines the preconfigured downlink subframe subset, the base station sends the scheduling information to the UE in the preconfigured downlink subframe subset. The scheduling information includes the PUCCH resource indication information. When the PUCCH resource indication information is the second status, the UE may determine the second codebook.

Optionally, in some embodiments of the present disclosure, the scheduling information includes the PUCCH resource indication information.

Specifically, the PUCCH resource indication information and the preconfigured downlink subframe subset are used to instruct the UE to determine the PUCCH resource. The PUCCH resource indication information and the preconfigured downlink subframe subset are in correspondences with the PUCCH resource. When the base station sends the scheduling information to the UE in the preconfigured downlink subframe subset, the UE determines the preconfigured downlink subframe subset according to the carrier or the subframe corresponding to the scheduling information, determines the second codebook according to the preconfigured downlink subframe subset, and determines the PUCCH resource according to a bit quantity of the second codebook.

Optionally, in some embodiments of the present disclosure, the scheduling information includes the PUCCH resource indication information and a DAI total quantity indication.

Specifically, the DAI total quantity indication is used to instruct the UE to determine the PUCCH resource. The base station may send the PUCCH resource indication information and the DAI total quantity indication to the UE, and the UE may determine the PUCCH resource according to the PUCCH resource indication and the DAI total quantity indication.

Figure 6:
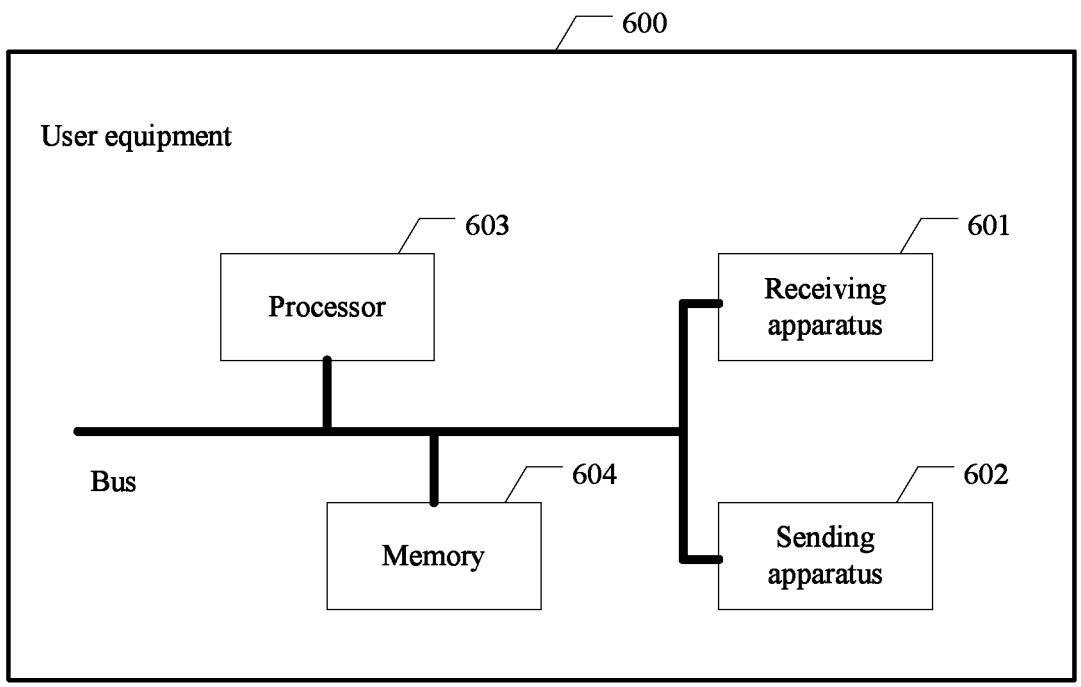
FIG. 6 is another schematic structural diagram of UE according to an embodiment of the present disclosure.

The foregoing describes the UE in the embodiments of the present disclosure from a perspective of a unitized functional entity, and the following describes the UE in the embodiments of the present disclosure from a perspective of hardware processing. Referring to FIG. 6, UE 600 in an embodiment of the present disclosure includes: a receiving apparatus 601, a sending apparatus 602, a processor 603, and a memory 604 (there may be one or more processors 603 in the UE 600, and there is, for example, one processor 603 in FIG. 6). The processor 603 and the memory 604 receive information outside the UE by using the receiving apparatus 601, and the processor 603 and the memory 604 send information from the UE by using the sending apparatus 602. In some embodiments of the present disclosure, the receiving apparatus 601, the sending apparatus 602, the processor 603, and the memory 604 may be connected through a bus or in another manner. The memory 604 may include a read-only memory and a random access memory, and provide an instruction and data for the processor 603. A part of the memory 604 may further include a RAM, or may further include a nonvolatile memory. An example in which the receiving apparatus 601, the sending apparatus 602, the processor 603, and the memory 604 are connected through a bus is used in FIG. 6.

The receiving apparatus 601 may be configured to implement a function of the receiving module 101 in the embodiment shown in FIG. 1.

The sending apparatus 602 may be configured to implement a function of the sending module 103 in the embodiment shown in FIG. 1.

The processor 603 may be configured to implement a function of the processing module 102 in the embodiment shown in FIG. 1.

Figure 7:
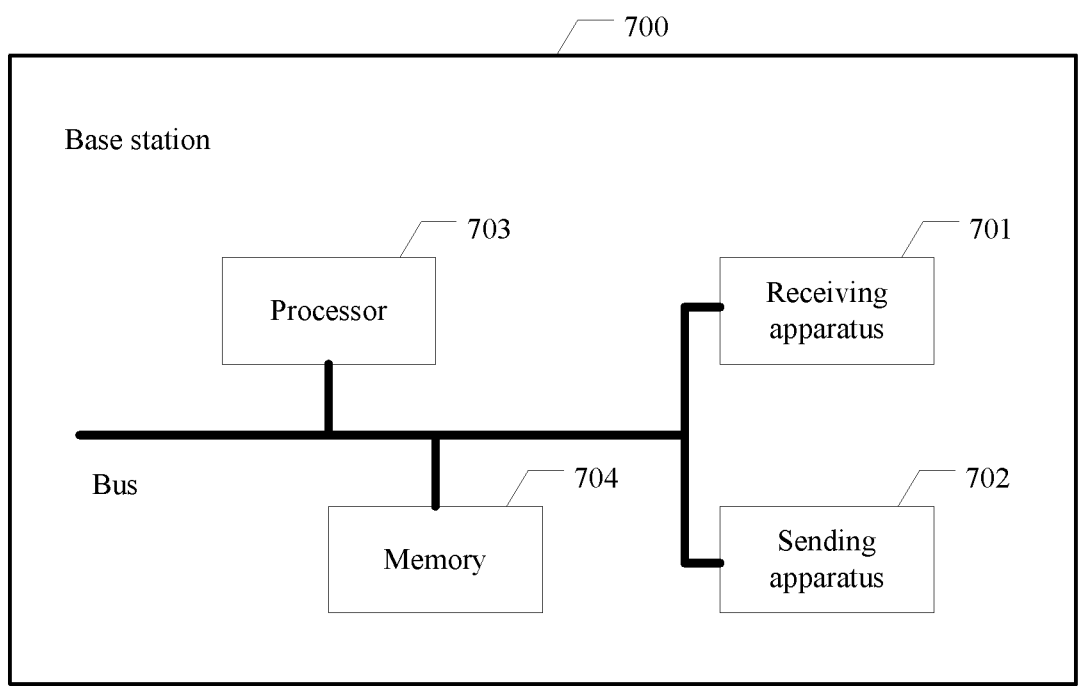
FIG. 7 is another schematic structural diagram of a base station according to an embodiment of the present disclosure.

Referring to FIG. 7, a base station 700 in an embodiment of the present disclosure includes:

a receiving apparatus 701, a sending apparatus 702, a processor 703, and a memory 704 (there may be one or more processors 703 in the base station 700, and there is, for example, one processor 703 in FIG. 7). The processor 703 and the memory 704 receive information outside the UE by using the receiving apparatus 701, and the processor 703 and the memory 704 send information from the UE by using the sending apparatus 702. In some embodiments of the present disclosure, the receiving apparatus 701, the sending apparatus 702, the processor 703, and the memory 704 may be connected through a bus or in another manner. The memory 704 may include a read-only memory and a random access memory, and provide an instruction and data for the processor 703. A part of the memory 704 may further include a RAM, or may further include a nonvolatile memory. An example in which the receiving apparatus 701, the sending apparatus 702, the processor 703, and the memory 704 are connected through a bus is used in FIG. 7.

The receiving apparatus 701 may be configured to implement a function of the receiving module 203 in the embodiment shown in FIG. 2.

The sending apparatus 702 may be configured to implement a function of the sending module 201 in the embodiment shown in FIG. 2.

The processor 703 may be configured to implement a function of the processing module 202 in the embodiment shown in FIG. 2.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A feedback information receiving method, comprising:
   determining an uplink subframe for receiving feedback information corresponding to downlink data;
   determining a physical uplink control channel (PUCCH) resource;
   sending scheduling information for scheduling the downlink data, on a downlink control channel to user equipment, wherein the downlink control channel is in a downlink subframe that belongs to a preconfigured downlink subframe set, and the preconfigured downlink subframe set is a set of downlink subframes that are associated with the uplink subframe and that are of all carriers configured for the user equipment by a base station;
   receiving on the PUCCH resource in the uplink subframe, encoded feedback information from the user equipment;
   wherein the scheduling information comprises PUCCH resource indication information and a downlink assignment index (DAI) accumulation indication, and
   the PUCCH resource indication information indicates the PUCCH resource, and a value of the DAI accumulation indication indicates an accumulative counting in a scheduled downlink subframe subset according to an order that is first in ascending order of a carrier index and then in ascending order of a subframe index, and the scheduled downlink subframe subset belongs to the preconfigured downlink subframe set.

2. The method according to claim 1, wherein the scheduling information further comprises a DAI total quantity indication, wherein the DAI total quantity indication indicates a sum of a quantity of scheduled carriers corresponding to a current downlink subframe and all downlink subframes before the current downlink subframe in the scheduled downlink subframe sub set.

3. The method according to claim 1, wherein
   a bit quantity of a codebook of the feedback information and the PUCCH resource indication information indicate the PUCCH resource in a preconfigured PUCCH resource set; or
   the PUCCH resource indication information, a bit quantity of a codebook of the feedback information, and a bit quantity of channel state information (CSI) indicate the PUCCH resource in a preconfigured PUCCH resource set.

4. The method according to claim 3, wherein
   the bit quantity of a codebook of the feedback information indicates a PUCCH resource subset in the preconfigured PUCCH resource set, and a status of the PUCCH resource indication information indicates the PUCCH resource in the PUCCH resource subset.

5. The method according to claim 3, wherein
   a bit capacity interval corresponding to the bit quantity of the codebook indicates a PUCCH resource subset in the preconfigured PUCCH resource set.

6. The method according to claim 5, wherein the bit capacity interval is predefined or is configured by radio resource control (RRC) signaling.

7. The method according to claim 3, wherein the preconfigured PUCCH resource set includes PUCCH resources of multiple different PUCCH formats.

8. A non-transitory computer-readable storage medium storing instructions that, when executed by a processor, cause a base station to carry out operations of:
   determining an uplink subframe for receiving feedback information corresponding to the downlink data;
   determining a physical uplink control channel (PUCCH) resource;
   sending scheduling information for scheduling the downlink data, on a downlink control channel to user equipment, wherein the downlink control channel is in a downlink subframe that belongs to a preconfigured downlink subframe set, and the preconfigured downlink subframe set is a set of downlink subframes that are associated with the uplink subframe and that are of all carriers configured for the user equipment by a base station;
   receiving on the PUCCH resource in the uplink subframe, encoded feedback information from the user equipment;
   wherein the scheduling information comprises PUCCH resource indication information and a downlink assignment index (DAI) accumulation indication, and
   the PUCCH resource indication information indicates the PUCCH resource, and a value of the DAI accumulation indication indicates an accumulative counting in a scheduled downlink subframe subset according to an order that is first in ascending order of a carrier index and then in ascending order of a subframe index, and the scheduled downlink subframe subset belongs to the preconfigured downlink subframe set.

9. The non-transitory computer-readable storage medium according to claim 8, wherein the scheduling information further comprises a DAI total quantity indication, wherein the DAI total quantity indication indicates a sum of a quantity of scheduled carriers corresponding to a current downlink subframe and all downlink subframes before the current downlink subframe in the scheduled downlink subframe subset.

10. The non-transitory computer-readable storage medium according to claim 8, wherein a bit quantity of a codebook of the feedback information and the PUCCH resource indication information indicate the PUCCH resource in a preconfigured PUCCH resource set; or the PUCCH resource indication information, a bit quantity of a codebook of the feedback information, and a bit quantity of channel state information (CSI) indicate the PUCCH resource in a preconfigured PUCCH resource set.

11. The non-transitory computer-readable storage medium according to claim 10, wherein
the bit quantity of a codebook of the feedback information indicates a PUCCH resource subset in the preconfigured PUCCH resource set, and a status of the PUCCH resource indication information indicates the PUCCH resource in the PUCCH resource subset.

12. The non-transitory computer-readable storage medium according to claim 10, wherein
a bit capacity interval corresponding to the bit quantity of the codebook indicates a PUCCH resource subset in the preconfigured PUCCH resource set.

13. The non-transitory computer-readable storage medium according to claim 12, wherein the bit capacity interval is predefined or is configured by radio resource control (RRC) signaling.

14. The non-transitory computer-readable storage medium according to claim 10, wherein the preconfigured PUCCH resource set includes PUCCH resources of multiple different PUCCH formats.

15. An apparatus, comprising:
one or more processors, and
at least one non-transitory storage medium configure to store program instructions;
wherein, when executed by the one or more processors, the instructions cause the apparatus to perform a method that comprises:
receiving scheduling information from a base station on a downlink control channel, wherein the downlink control channel is in a downlink subframe that belongs to a preconfigured downlink subframe set, and the scheduling information is used for scheduling downlink data;
determining an uplink subframe for sending feedback information corresponding to the downlink data, wherein the preconfigured downlink subframe set is a set of downlink subframes that are associated with the uplink subframe and that are of all carriers configured for user equipment by the base station;
determining a codebook of the feedback information according to a downlink assignment index (DAI) accumulation indication, wherein a value of the DAI accumulation indication indicates an accumulative counting in the scheduled downlink subframe subset according to an order that is first in ascending order of a carrier index and then in ascending order of a subframe index, the codebook corresponds to a scheduled downlink subframe subset, and the scheduled downlink subframe subset belongs to the preconfigured downlink subframe set;

determining a physical uplink control channel (PUCCH) resource according to PUCCH resource indication information; and
sending encoded feedback information on the PUCCH resource in the uplink subframe.

16. The apparatus according to claim 15, wherein the method further comprise:
determining the codebook according to the DAI accumulation indication and a DAI total quantity indication, wherein the DAI total quantity indication indicates a sum of a quantity of scheduled carriers corresponding to a current downlink subframe and all downlink subframes before the current downlink subframe in the scheduled downlink subframe subset.

17. The apparatus according to claim 15, wherein the method further comprises:
determining the PUCCH resource in a preconfigured PUCCH resource set in the uplink subframe according to one of:
a bit quantity of the codebook and the PUCCH resource indication information, or
the PUCCH resource indication information, the bit quantity of the codebook, and a bit quantity of channel state information (CSI).

18. The apparatus according to claim 17, wherein the method further comprises:
determining a PUCCH resource subset in the preconfigured PUCCH resource set according to the bit quantity of the codebook; and
determining the PUCCH resource in the PUCCH resource subset according to a status of the PUCCH resource indication information.

19. The apparatus according to claim 17, wherein
a bit capacity interval corresponds to the bit quantity of the codebook; and
the PUCCH resource in the preconfigured PUCCH resource set is determined according to the bit capacity interval.

20. The apparatus according to claim 17, wherein the preconfigured PUCCH resource set includes PUCCH resources of multiple different PUCCH formats.

21. The method according to claim 1, wherein
the DAI accumulation indication is located in each scheduling information of the scheduled downlink subframe subset.

22. The non-transitory computer-readable storage medium according to claim 8, wherein
the DAI accumulation indication is located in each scheduling information of the scheduled downlink subframe subset.

23. The apparatus according to claim 15, wherein
the DAI accumulation indication is located in each scheduling information of the scheduled downlink subframe subset.

* * * * *